July 6, 1926.

B. B. BARRETT

AUTOMOBILE LOCKING DEVICE

Filed Sept. 3, 1925

1,591,603

B. B. Barrett
Inventor

Patented July 6, 1926.

1,591,603

UNITED STATES PATENT OFFICE.

BERT B. BARRETT, OF MINDEN, LOUISIANA.

AUTOMOBILE LOCKING DEVICE.

Application filed September 3, 1925. Serial No. 54,300.

This invention relates to a locking device especially designed for use in connection with a well known type of motor vehicle, the primary object of the invention being to provide a device of this character which will lock the pedals of a motor vehicle in their neutral positions to insure against unauthorized persons operating the vehicle.

A further object of the invention is the provision of a device of this character which may be readily positioned over the pedals of the motor vehicle and locked in such position to prevent removal thereof.

A still further object of the invention is to provide a device of this character which will be strong and durable and one which will be exceedingly cheap to manufacture.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
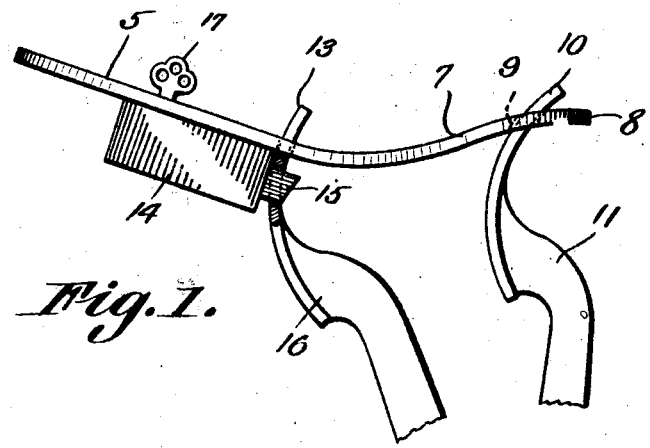
Figure 1 is an elevational view illustrating a lock constructed in accordance with the invention as positioned on the controlling pedals of a motor vehicle.
Figure 2:
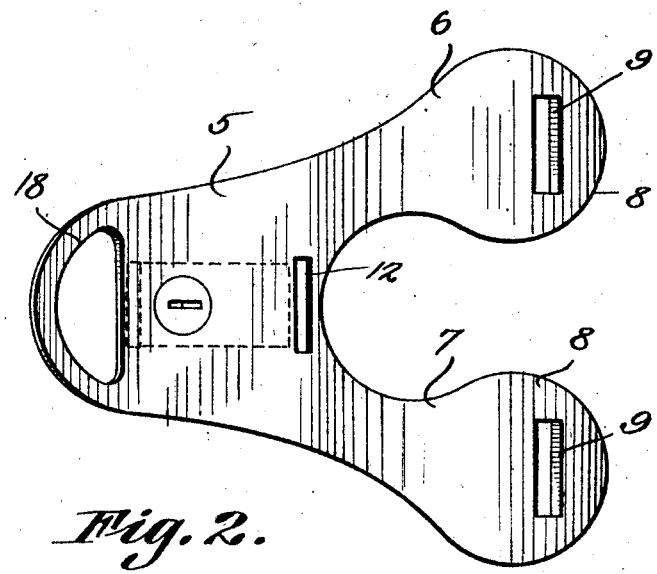
Figure 2 is a plan view of the locking device.

Referring to the drawing in detail, the device includes a body portion 5 provided with integral arms 6 and 7 respectively, the arms being spaced apart as clearly shown by Figure 2 and provided with enlargements 8.

Formed in each enlargement is an elongated opening 9 which openings are of constructions to accommodate the toes 10 of the pedals 11 of the motor vehicle. The body portion 5 is also formed with an elongated opening indicated at 12, which opening is designed to receive the reverse pedal toe 13. Thus it will be seen that due to this construction, the device will be securely held in position over the pedals of the motor vehicle.

Supported under the body portion 5 is a lock 14 provided with a sliding bolt 15 adapted to fit in a suitable opening formed in the reverse pedal which in the present showing is indicated at 16, to lock the device in position, in such a way the same may not be removed by unauthorized persons.

The lock 14 may be operated by a key such as indicated at 17 which may be positioned through a suitable keyhole formed in the body portion 5.

A hand-hold indicated at 18 is formed in the body portion 5 and affords means whereby the device may be readily handled by a person to apply the device, or remove it.

I claim:—

1. In a device of the character described, a body portion, a pair of arms formed integral with the body portion, said arms having enlargements at their free ends, said enlargements having openings to accommodate the toes of motor vehicle pedals, said body portion having an opening to receive the toe of a pedal, and means for locking the device in position.

2. In a device of the character described, a body portion having an opening to receive a pedal toe, arms forming a part of the body portion and having openings to receive the toes of pedals, one of said pedals having an opening, a lock including a sliding bolt adapted to move in the last mentioned opening to lock the device to the pedals, and said body portion having a hand-hold.

In testimony that I claim the foregoing as my own, I have hereto affixed my signature.

BERT B. BARRETT.